US009218602B2

(12) United States Patent
Duan et al.

(10) Patent No.: US 9,218,602 B2
(45) Date of Patent: Dec. 22, 2015

(54) PROVIDING PAGE NAVIGATION IN MULTIROLE-ENABLED NETWORK APPLICATION

(75) Inventors: Ning Duan, Beijing (CN); Bo Gao, Beijing (CN); Chang J. Guo, Beijing (CN); Zhong B. Jiang, Zhejiang (CN); Wei Sun, Beijing (CN); Zhi H. Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 13/504,013

(22) PCT Filed: Oct. 25, 2010

(86) PCT No.: PCT/EP2010/066030
§ 371 (c)(1),
(2), (4) Date: Apr. 25, 2012

(87) PCT Pub. No.: WO2011/051208
PCT Pub. Date: May 5, 2011

(65) Prior Publication Data

US 2012/0209997 A1 Aug. 16, 2012

(30) Foreign Application Priority Data

Oct. 30, 2009 (CN) .......................... 2009 1 0207778

(51) Int. Cl.
*G06F 15/173* (2006.01)
*G06Q 30/00* (2012.01)

(52) U.S. Cl.
CPC ...................................... *G06Q 30/00* (2013.01)

(58) Field of Classification Search
CPC .... H04L 29/08072; H04L 29/06; H04L 43/00
USPC ......................... 709/223, 224, 226, 227, 228
See application file for complete search history.

(56) References Cited

U.S. PATENT DOCUMENTS

2003/0045958 A1* 3/2003 Brandt et al. ................. 700/101
2006/0004763 A1* 1/2006 Horvitz et al. .................... 707/9
(Continued)

FOREIGN PATENT DOCUMENTS

WO WO2011/051208 A3 5/2011

OTHER PUBLICATIONS

"Statement in accordance with the Notice from the European Patent Office dated Oct. 1, 2007 concerning business methods (OJ EPO Nov. 2007, 592-593)", XP002456414, Nov. 1, 2007, 1 page.
(Continued)

*Primary Examiner* — Philip Chea
*Assistant Examiner* — Van Kim T Nguyen
(74) *Attorney, Agent, or Firm* — Francis Lammes; Stephen J. Walder, Jr.; Jennifer R. Davis

(57) ABSTRACT

The present invention discloses an apparatus, method and computer program for providing page navigation in a multi-role-enabled network application. The apparatus comprises: a virtual role creator adapted to create a virtual role for each user in the multirole-enabled network application based upon an atomic role set configured for the user; an access pattern generator adapted to generate a virtual-role-based access pattern by recording page access requests of the user and by performing pattern mining for the recorded page access requests according to the virtual role of the user; and a page navigation provider adapted to provide page navigation by utilizing the access pattern corresponding to the virtual role of the user when the user accesses the multirole-enabled network application. With the technical solution of the invention, pattern mining can be performed for access data of one or more users according to virtual role, so the user can be provided with optimized personalized page navigation.

18 Claims, 14 Drawing Sheets

(56) References Cited

U.S. PATENT DOCUMENTS

| | | | | |
|---|---|---|---|---|
| 2007/0206584 | A1 | 9/2007 | Fulling et al. | |
| 2008/0281617 | A1 | 11/2008 | Conrad et al. | |
| 2008/0320081 | A1 | 12/2008 | Shriver-Blake et al. | |
| 2009/0037355 | A1 | 2/2009 | Brave et al. | |
| 2010/0082515 | A1* | 4/2010 | Relyea et al. | 706/47 |
| 2013/0007636 | A1* | 1/2013 | Boss et al. | 715/757 |

OTHER PUBLICATIONS

Mietzner, Ralph et al., "Generation of BPEL Customization Processes for SaaS Applications from Variability Descriptors", 2008 IEEE International Conference on Services Computing, Honolulu, Hawaii, Jul. 7-11, 2008, pp. 359-366.

Muller, Jurgen et al., "Customizing Enterprise Software as a Service Applications: Back-End Extension in a Multi-tenancy Environment", Enterprise Information Systems, Lecture Notes in Business Information Processing, vol. 24, I, Italy, 2009, pp. 66-77.

Sugiyama, Kazunari et al., "Adaptive Web Search Based on User Profile Constructed without Any Effort from Users", World Wide Web Conference, 2004 (WWW2004), New York, New York, May 17-22, 2004, pp. 675-684.

Sun, Wei et al., "Software as a Service: Configuration and Customization Perspectives", 2008 IEEE Congress on Services Part II, Beijing, China, Sep. 23-26, 2008, pp. 18-25.

Chen, Ming-Syan et al., "Efficient Data Mining for Path Traversal Patterns", IEEE Transactions on Knowledge and Data Engineering, vol. 10, No. 2, Mar.-Apr. 1998, pp. 209-221.

* cited by examiner

| Footprint ID | User ID | Access time | Page ID | Context parameter | Dwell time |
|---|---|---|---|---|---|
| f1 | User1 | [2008-05-10 15:20:25] | P1 | | 5 |
| f2 | User1 | [2008-05-10 15:20:30] | P3 | | 20 |
| f3 | User1 | [2008-05-10 15:20:50] | P4 | | 60 |
| f4 | User1 | [2008-05-10 15:21:50] | P7 | orderid | 60 |
| ... | ... | ... | ... | ... | ... |

Fig. 6

| Virtual role ID | TG1.VR1 | TG1.VR2 | TG2.VR1 | ... |
|---|---|---|---|---|
| Virtual role value | TG1, R1, R2 | TG1, R2, R3 | TG2, R3 | ... |
| Page path pattern | P1->P2 | P3->P4->P7<br>P4->P5->P7 | P4->P5->P7 | ... |
| Page jump context parameter | | P4->P7:orderid | | ... |

Fig. 7

PROVIDING PAGE NAVIGATION IN MULTIROLE-ENABLED NETWORK APPLICATION

BACKGROUND

The present invention relates to the field of computer network applications and in particular to an apparatus and a method for providing page navigation in a multirole-enabled network application, e.g., Software as a Service (SaaS) application.

User experience of a website is of great importance to Independent Software Vendors (ISVs) who have been seeking a method to improve user experience. Efficient page navigation is one of important factors in improving user experience and enhancing user satisfaction.

In a traditional network application, a software provider typically investigates the demand of a specific customer to know a service flow of the customer and therefore can design well a page flow based upon predefined knowledge to accommodate user experience.

In contrast to this, SaaS is a pattern in which software is provided over the Internet so that a customer will not purchase any software but instead lease Web-based software from the ISV. Since a software service provided through SaaS is not oriented to any specific customer, and usage patterns of different customers leasing the software (also referred to "tenant" in the context of SaaS) tend to vary, user access behaviors of the different tenants also will differ from one another. Thus, a unified predefined page flow will burden some users.

For example, FIG. 1 illustrates an illustrative SaaS application regarding sale management, wherein atomic roles, e.g., "Salesman", "Sale Manager", "Stock Manager", etc., have been defined according to the allocation of their tasks. As illustrated in FIG. 1, a tenant 1 is a middle-size enterprise with a large amount of sale, and therefore it is necessary to have different people responsible for tasks of order submission, order review and approval, stock handling, etc., respectively. Consequently, the predefined atomic roles of "Salesman", "Sale Manager", "Stock Manager", etc., are allocated to different people (i.e., users). Thus, when a user in the Tenant 1 is configured with the role of "Salesman", he is authorized to have an access to three webpages of "Sale Homepage", "Order Generation" and "Order Submission" and to perform the task of order submission in a predefined page flow of "Sale Webpage"→"Order Generation"→"Order Submission". When a user is configured with the role of "Sale Manager", he is authorized to have an access to three webpages of "Sale Homepage", "List of Sale Orders" and "Order Review and Approval" and to perform the task of task review and approval in a predefined page flow of "Sale Homepage"→"List of Sale Orders"→"Order Review and Approval". When a user is configured with the role of "Stock Manager", he is authorized to have an access to three pages of "Stock Webpage", "List of Stock Orders" and "Stock Handling" and to perform the task of stock handling in a predefined page flow of "Sale Webpage"→"List of Stock Orders"→"Stock Handling". In contrast to this, a Tenant 2 is a small-size enterprise with a small amount of sale, and therefore it is sufficient to simply have the same personal centrally responsible for the tasks of order submission, order review and approval, stock handling, etc., that is, the atomic roles of "Salesman", "Sale Manager", "Stock Manager", etc., will be allocated to the same user. Therefore, the user is authorized to have an access to all of the foregoing pages and to perform all of the foregoing tasks in a predefined page flow of "Sale Webpage"→"Order Generation"→"Order Submission"→"Sale Homepage"→"List of Stock Orders"→"Order Review and approval"→"Stock Webpage"→"List of Stock Orders"→"Stock Handling". However, it is preferred for the user of the Tenant 2 to enter the page of "Order Review and approval" directly after the page of "Order Submission" without entering the pages of "Sale Homepage" and "List of Sale Orders" and enter the page of "Stock Handling" directly after the page of "Order Review and approval" without entering the pages of "Stock Homepage" and "List of Stock orders". The predefined page flow is not appropriate to the Tenant 2.

As can be apparent, how to recognize an access behavior pattern of a user and to provide hereby a more smooth page flow becomes a crucial issue for the ISV.

In the prior art, a technical solution has been proposed for mining an access behavior pattern of a user to recognize the access pattern of the user. However, pattern mining in the existing technical solution is performed separately for respective users, and it may take a long period of time to accumulate access data of the respective users in order to acquire their access patterns; and for a new user, his or her access pattern is unavailable, and consequently no personalized page navigation can be provided. Moreover, a large number of resources are required to calculate and store the access patterns of the respective users.

Therefore, there is a need in the art to address the aforementioned problem.

SUMMARY

Summary of the invention will be given below to provide basic understanding of some aspects of the invention. However, it shall be appreciated that this summary is neither exhaustively descriptive of the invention nor intended to define essential or important parts or the scope of the invention, but is merely for the purpose of presenting some concepts in a simplified form and hereby acts as a preamble of detailed description which will be discussed later.

In view of the above circumstances in the prior art, preferred embodiments of the present invention provide an apparatus, method and computer program for providing page navigation in a multirole-enabled network application. e.g., a SaaS application, etc., which can address one or more of the technical problems in the prior art.

To this end, viewed from a first aspect, the present invention provides an apparatus for providing page navigation in a multirole-enabled network application, which comprises: a virtual role creator adapted to create a virtual role for each user in the multirole-enabled network application based upon an atomic role set configured for the user; an access pattern generator adapted to generate a virtual-role-based access pattern by recording page access requests of the user and by performing pattern mining for the recorded page access requests according to the virtual role of the user; and a page navigation provider adapted to provide page navigation by utilizing the access pattern corresponding to the virtual role of the user when the user accesses the multirole-enabled network application.

Viewed from a second aspect, the present invention provides a method for providing page navigation in a multirole-enabled network application, which comprises: a virtual role creating step of creating a virtual role for each user in the multirole-enabled network application based upon an atomic role set configured for the user; an access pattern generating step of generating a virtual-role-based access pattern by recording page access requests of the user and by performing pattern mining for the recorded page access requests according to the virtual role of the user; and a page navigation providing step of providing page navigation by utilizing the access pattern corresponding to the virtual role of the user when the user accesses the multirole-enabled network application.

Viewed from a third aspect, the present invention provides a computer program stored on a computer readable medium and loadable into the internal memory of a digital computer, comprising software code portions, when said program is run on a computer, for performing the steps of the invention.

Moreover, an embodiment of the invention further provides a computer program product for performing the foregoing method for providing page navigation in a multirole-enabled network application.

Moreover, an embodiment of the invention further provides a computer readable medium on which there are recorded computer program codes for performing the foregoing method for providing page navigation in a multirole-enabled network application.

Advantageously, in the technical solution of the invention as compared with the existing user-based technical solution, since pattern mining is performed for access data of one or more users according to the virtual role and the virtual role typically corresponds to a group of users, the access data of the users can be accumulated rapidly for pattern mining, and since the number of virtual roles is much smaller than the number of users, resources required for calculation and storage of access patterns can be conserved. Moreover, when the role of a user is changed, accurate personalized page navigation can be provided for the user by utilizing an access pattern, if any, corresponding to the new role of the user. Also, for a new user, accurate personalized page navigation can be provided for the user by utilizing an access pattern, if any, corresponding to the role of the new user.

BRIEF DESCRIPTION OF THE SEVERAL VIEWS OF THE DRAWINGS

The present invention will now be described, by way of example only, with reference to preferred embodiments, as illustrated in the following figures:

FIG. 6 illustrates an example of a request log table;

FIG. 7 illustrates an example of a virtual role access pattern map table;

DETAILED DESCRIPTION

Figure 1:
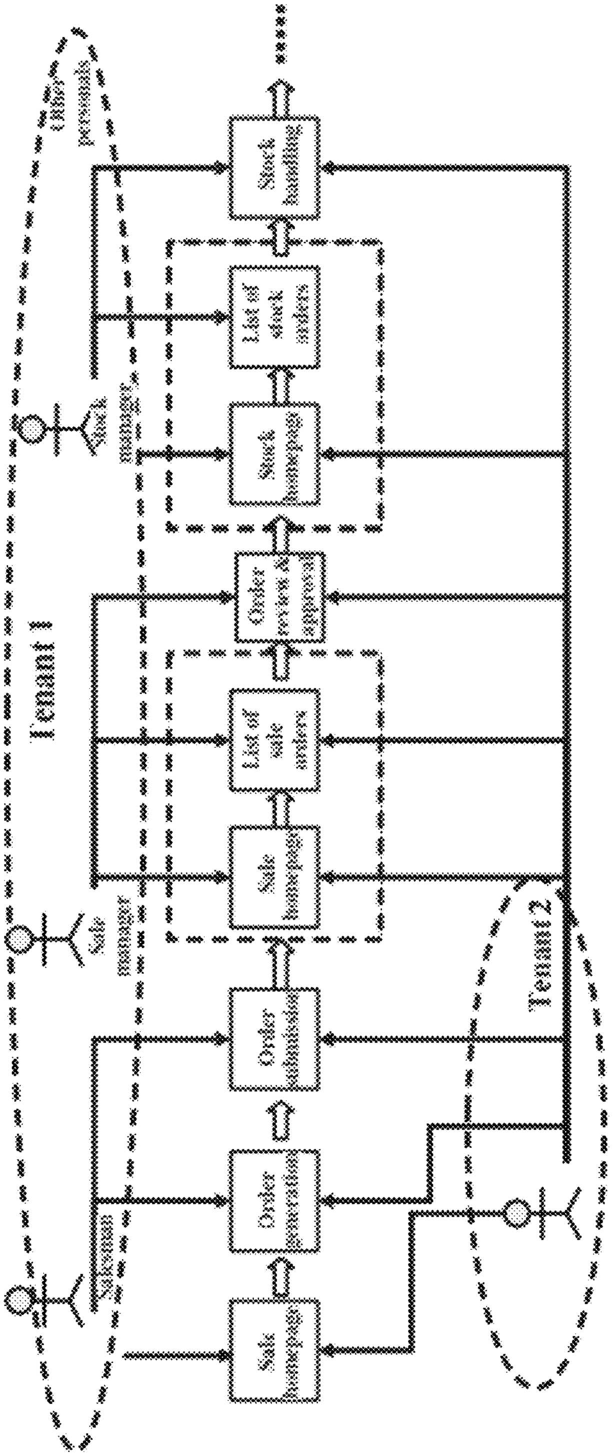
FIG. 1 illustrates an illustrative SaaS application regarding sale management.

Exemplary preferred embodiments of the present invention will be described in conjunction with the accompanying drawings hereinafter. For the sake of clarity and conciseness, not all the features of actual implementations are described in the specification. However, it is to be appreciated that, during developing any of such actual implementations, numerous implementation-specific decisions must be made to achieve the developer's specific goals.

Here, it shall further be noted that only device structures and/or processing steps closely relevant to solutions of the invention will be illustrated in the drawings while omitting other details less relevant to the invention so as not to obscure the invention due to those unnecessary details.

Figure 2:
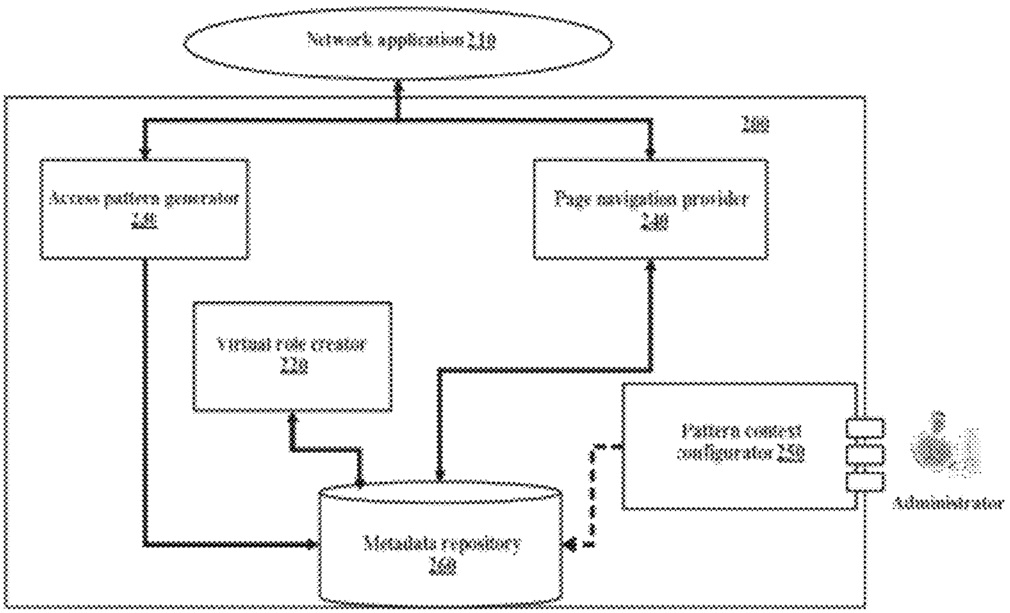
FIG. 2 illustrates a structural block diagram of an apparatus for providing page navigation in a multirole-enabled network application, e.g., a SaaS application, etc., according to an embodiment of the invention.

FIG. 2 illustrates a structural block diagram of an apparatus 200 for providing page navigation in a multirole-enabled network application 210, e.g., a Software as a Service (SaaS) application, etc., according to a preferred embodiment of the present invention. As illustrated in FIG. 2, the apparatus 200 for providing page navigation according to the preferred embodiment of the present invention (simply referred below to "page navigation providing apparatus 200") may comprise a virtual role creator 220, an access pattern generator 230, a page navigator 240, a pattern context configurator 250 and a metadata repository 260.

The virtual role creator 220 may create a virtual role for each user in the multirole-enabled network application 210 based upon a predefined atomic role set configured for the user. The structure of the virtual role creator 220 according to a particular preferred embodiment of the present Invention will be described below in further details with reference to FIG. 4 taking a SaaS application as an example.

In the case that the multirole-enabled network application 210 is a SaaS application, a user belongs to a tenant of the SaaS application, and an atomic role set of the user is configured for the user with respect to the tenant of the SaaS application. Due to the similarity of user access behaviors of respective tenants in the same tenant group, the virtual role creator 220 may preferably further create the virtual role based upon the tenant group to which the tenant belongs, Thus, when anew tenant is on boarding (that is being created), a user of the tenant can be provided with accurate personalized page navigation by utilizing an access pattern, if any, of a tenant group to which the tenant belongs.

Figure 3:
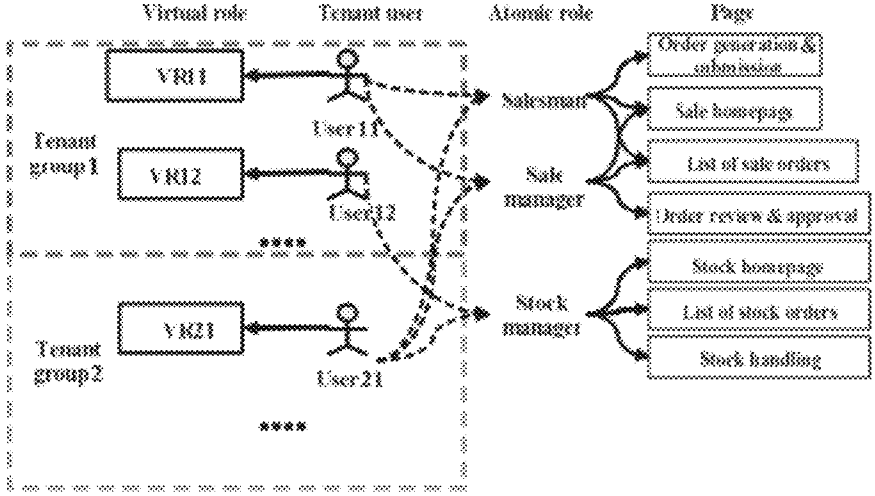
FIG. 3 is an illustrative schematic diagram showing how to create a virtual role in the SaaS scenario illustrated in FIG. 1.

FIG. 3 illustrates an illustrative schematic diagram showing how to create a virtual role in the SaaS scenario illustrated in FIG. 1. As illustrated in FIG. 3, a user User 11 in a tenant group 1 is configured with two atomic roles of "Salesman" and "Sale Manager", and therefore a virtual role VR11 may be created based upon the tenant group 1 and an atomic role set {"Salesman", "Sale Manager"} configured for User 11. A user User 12 in the tenant group 1 is configured with an atomic role of "Stock Manager", and therefore a virtual role VR12 may be created based upon the tenant group 1 and the atomic role set {"Stock Manager"} configured for User 12. Moreover, a user User 21 in a tenant group 2 is configured with three atomic roles of "Salesman", "Sale Manager" and "Stock Manager", and therefore a virtual role VR21 may be created based upon the tenant group 2 and the atomic role set {"Salesman", "Sale Manager", "Stock Manager"} configured for User 21, The access pattern generator 230 may generate a virtual-role-based access pattern by recording page access requests of the user and by performing pattern mining for the recorded page access requests according to the virtual role of the user. Here, the access pattern may comprise a page path pattern and/or a page jump context parameter. The structure of the access pattern generator 230 according to a particular preferred embodiment of the present invention will be described below in further details with reference to FIG. 5 taking a SaaS application as an example.

The page navigator 240 may provide page navigation by utilizing the access pattern corresponding to the virtual role of the user when the user accesses the multirole-enabled network application 210. The structure of the page navigator 240 according to a particular preferred embodiment of the present invention will be described below in further details with reference to FIG. 7 taking a SaaS application as an example.

Optionally, the page navigation providing apparatus 200 may further comprise the pattern context configurator 250 Which may assist an administrator in configuring the page jump context parameter in the access pattern. Here, the page jump context parameter may be generated automatically by the access pattern generator 230 during pattern mining and modified by the administrator through the pattern context configurator 250 or may be totally configured manually by the pattern context configurator 250.

Optionally, the page navigation providing apparatus 200 may further comprise the metadata repository 260 which may store atomic role configuration information of users, virtual roles created by the virtual role creator 220, page access requests recorded and access patterns generated by the access pattern generator 230, etc.

Particular embodiments of the respective components of the webpage navigation providing apparatus 200 will be described below in details taking a SaaS application as an example. However, those skilled in the art shall appreciate that the invention will not be limited to SaaS application but may be applicable to any multirole-enabled network application.

Figure 4:
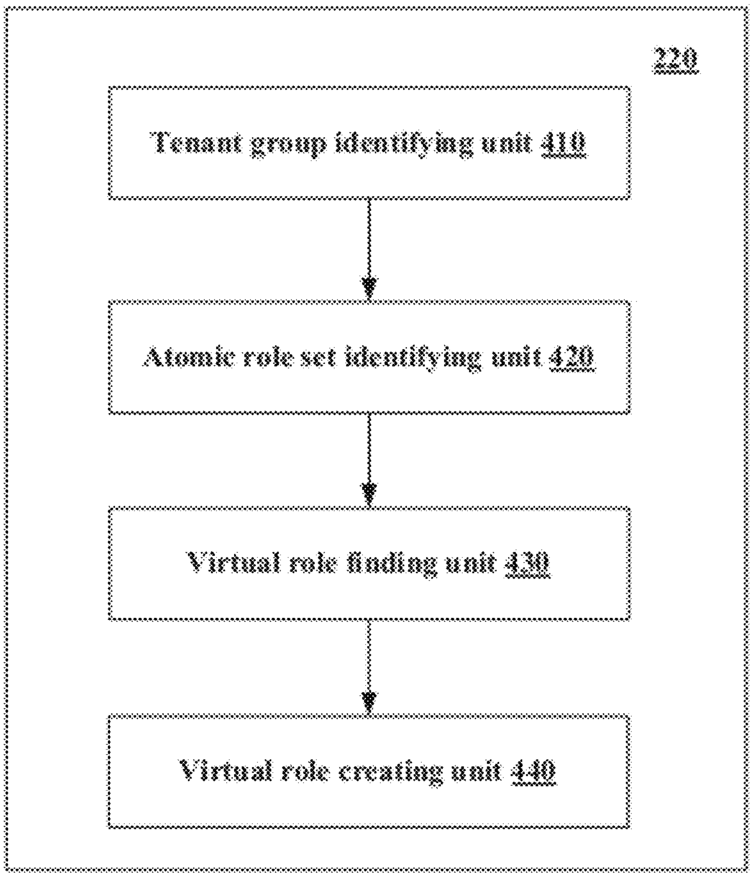
FIG. 4 illustrates a structural block diagram of a virtual role creator according to a particular preferred embodiment of the present invention.

FIG. 4 illustrates a structural block diagram of the virtual role creator 220 according to a particular preferred embodiment of the present invention. As illustrated in FIG. 4, the virtual role creator 220 may comprise a tenant group identifying unit 410, an atomic role set identifying unit 420, a virtual role finding unit 430 and a virtual role creation unit 440.

For example, when a tenant of the SaaS application is on boarding, the tenant group identifying unit 410 may identify a tenant group to which the current tenant belongs, for example, according to tenant configuration information stored in the metadata repository 260. Specifically, the tenant configuration information may be stored in the metadata repository 260 in the form of a table including fields of "Tenant ID", "Tenant group ID", etc., for example, and the tenant group identifying unit 410 may retrieve information in the relevant field of "Tenant group ID" from the table according to the identification (ID) of the current tenant so as to identify the tenant group to which the current tenant belongs.

The atomic role set identifying unit 420 may identify a predefined atomic role set configured for each user of the tenant, for example, according to user configuration information stored in the metadata repository 260. Specifically, the user configuration information may be stored, in the metadata repository 260 in the form of a table including fields of "User ID", "Configuration Information of Atomic Role Set", etc., for example, and the atomic role set identifying unit 420 may retrieve information in the relevant field of "Configuration Information of Atomic Role Set" from the table according to the ID of the current user so as to identify the predefined atomic role set configured for the user.

The virtual role finding unit 430 may query virtual role map table in the metadata repository 260 with the identified tenant group and the identified atomic role set, to find out whether there is a virtual role in match with the identified tenant group and the identified atomic role set.

If there is no virtual role in match, then the virtual role creation unit 440 may create a virtual role based upon the identified tenant group and the identified atomic role set, and store it in the virtual role map table of the metadata repository 260, for example.

Figure 5:
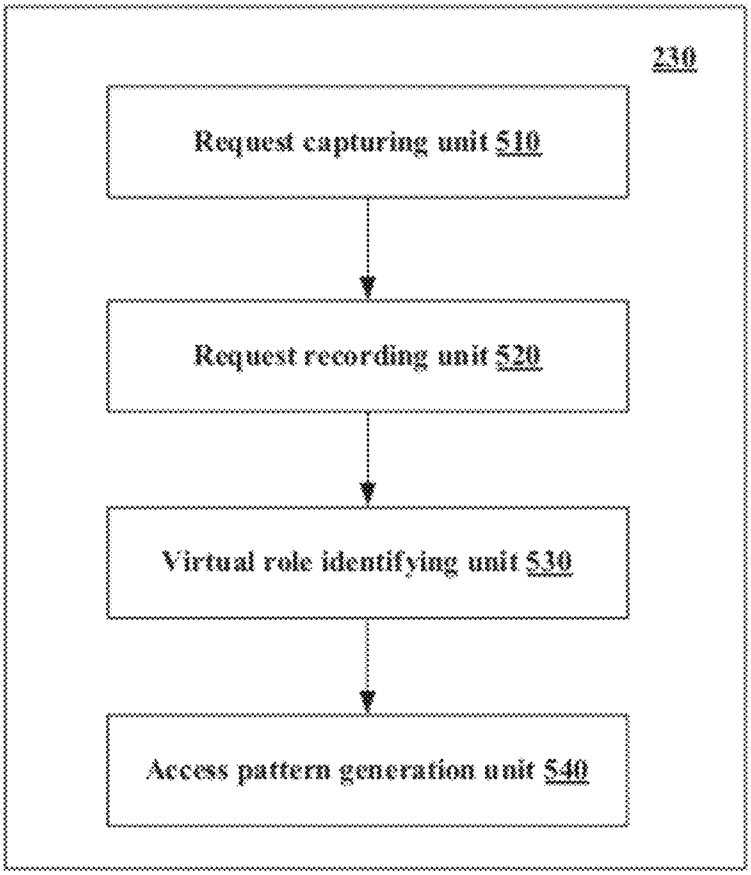
FIG. 5 illustrates a structural block diagram of an access pattern generator according to a particular preferred embodiment of the present invention.

FIG. 5 illustrates a structural block diagram of the access pattern generator 230 according to a particular preferred embodiment of the present invention. As illustrated in FIG. 5, the access pattern generator 230 may comprise a request capturing unit 510, a request recording unit 520, a virtual role identifying unit 530 and an access pattern generation unit 540.

For example, when a user of a tenant accesses a SaaS application, the request capturing unit 510 may capture a page access request of the user.

The request recording unit 520 may record the page access request of the user in a request log table of the metadata repository 260, for example. FIG. 6 illustrates an example of the request log table. As illustrated in FIG. 6, the request log table comprises fields of "Footprint ID", "User ID", "Access Time", "Page ID", "Context Parameter", "Dwell time", etc., where the field of "Footprint ID" identifies the recorded page access request, the field of "User ID" identifies the user, the field of "Access Time" records the time when the page access request is received, the field of "Page ID" identifies the currently accessed page, the field of "Context Parameter" records a context parameter of the page, and the field of "Dwell Time" records a period of time since the user enters the page until he or she quits the page so that a request with "Dwell Time" below a predetermined time threshold, e.g., 10 seconds, may be filtered out during pattern mining. For example, a request whose "Footprint ID" is f1 in the request log table of FIG. 6 will be filtered out during subsequent pattern mining.

The virtual role identifying unit 530 may identify a tenant group to which the current tenant belongs and the atomic role set of the user from the captured page access request and identify a virtual role of the user according to the identified tenant group and atomic role set. Specifically, the virtual role identifying unit 530 may identify the tenant group to which the current tenant belongs according to the tenant configuration information stored in the metadata repository 260, for example, and identify the atomic role set configured for the user according to the user configuration information stored in the metadata repository 260, for example. Then, the virtual role identifying unit 530 may query the virtual role map table in the metadata repository 260, for example, with the identified tenant group and atomic role set, so as to determine the virtual role of the user.

The access pattern generation unit 540 may generate a virtual-role-based access pattern by performing pattern mining for the recorded page access requests according to the virtual role of the user and store it in a virtual role access pattern map table of the metadata repository 260, for example, in association with the virtual role. Here, a process of pattern mining for the page access requests may be performed based upon any existing or future available technology. A specific pattern mining algorithm has been disclosed in the article "Efficient data mining for path traversal patterns", by Ming-Syan Chen, et al, in IEEE TRANSACTIONS KNOWLEDGE AND DATA ENGINEERING, Vol. 10, No. 2, March/April 1998, for example.

FIG. 7 illustrates an example of the virtual role access pattern map table. As illustrated in FIG. 7, the virtual role access pattern map table comprises fields of "Virtual Role ID", "Virtual Role Value", "Page Path Pattern" and "Page Jump Context Parameter", where the virtual role of TG1.VR1 (i.e., the virtual role VR1 of the tenant group 1, which is based upon the tenant group 1 and the atomic role set {R1, R2}) has a page path pattern of "P1→P2" and no page jump context parameter; the virtual role of TG1.VR2 (i.e., the virtual role VR2 of the tenant group 1, which is based upon the tenant group 1 and the atomic role set {R2, R3}) has page path patterns of "P3→P4→P7" and "P4→P5→P7" and a page jump context parameter of "P4→P7:orderid"; and the virtual role of TG2.VR1 (i.e., the virtual role VR1 of the tenant group 2, which is based upon the tenant group 2 and the atomic role set {R3}) has a page path pattern of "P4→P5→P7" and no page jump context parameter.

Figure 8:
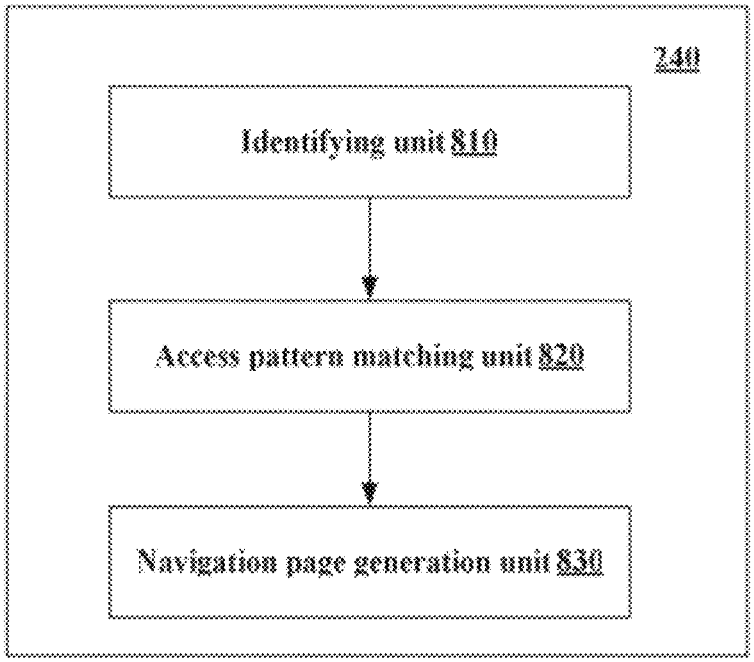
FIG. 8 illustrates a structural block diagram of a page navigator according to a particular preferred embodiment of the present invention.

FIG. 8 illustrates a structural block diagram of the page navigator 240 according to a particular preferred embodiment of the present invention. As illustrated in FIG. 8, the page navigator 240 may comprise an identifying unit 810, an access pattern matching unit 820 and a navigation page generation unit 830.

When a user of a tenant accesses a SaaS application, for example, the identifying unit 810 may capture a page access request of the user to identify there from the virtual role and the current access path of the user. Here, a process of identifying the virtual role of the user is similar to that of the virtual role identifying unit 520 in FIG. 5, and therefore repeated description thereof will be omitted here. Moreover, the identifying unit 810 may acquire the current access path from a user session.

The access pattern matching unit 820 may query the virtual role access pattern map table in the metadata repository 260, for example, based upon the identified virtual role and current access path of the user, to match a corresponding access pattern, so as to extract one or more recommended pages and relevant page jump context information.

Figure 9:
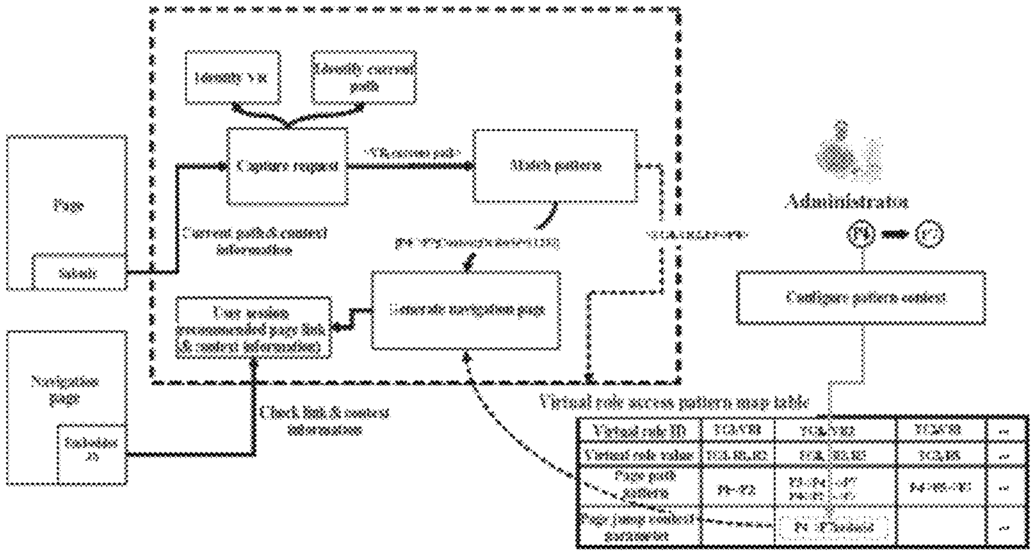
FIG. 9 illustrates an illustrative scenario in which a page jump context parameter is configured and page navigation is provided according to a particular preferred embodiment of the present invention.

For example, as illustrated in FIG. 9, when the virtual role and current access path of the user are identified as TG1.VR2 and P3→P4, the recommended page P7 may be acquired from the page path pattern of "P3→P4→P7" by querying the virtual role access pattern map table illustrated at the lower right corner of FIG. 9, for example. The context parameter of orderid with the value of 11232 may be acquired from the current access request according to the page jump context parameter of "P4→P7:orderid". Incidentally, it is illustrated in the example of FIG. 9 that the page jump context parameter of "P4→P7:orderid" in the access pattern associated with the virtual role of TG1.VR2 of the user has been configured by the administrator through the pattern context configurator 250.

The navigation page generation unit 830 may generate a navigation page including link(s) to the above one or more recommended pages and the relevant page jump context information. For example, as illustrated in FIG. 9, the navigation page generation unit 830 generates the link(s) to the above one or more recommended pages from page information stored in the metadata repository 260, for example. Specifically, the page information may be stored in the metadata repository 260 in the form of a table including fields of "Page ID", "Page Description", "Page URL", etc., for example, and the navigation page generation unit 830 may retrieve information in the relevant fields of "Page Description", "Page URL", etc., from the table according to the ID of the recommended page to thereby generate from the retrieved information the link to the recommended page. Then, the navigation page generation unit 830 may put the link(s) to the above one or more recommended pages and the relevant page jump context information into the user session and generate the navigation page embedded within a JavaScript program that may be run in the browser of the user to provide the user with page navigation in the following process flow illustrated in FIG. 10, for example.

Figure 10:
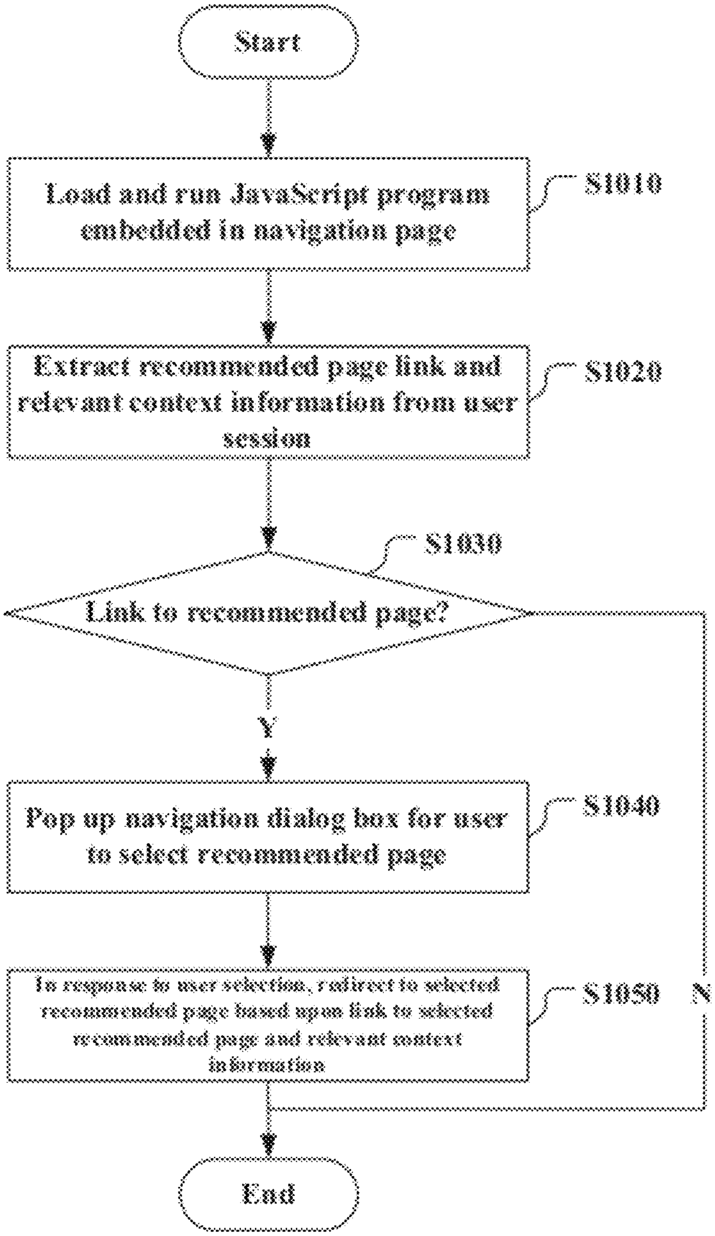
FIG. 10 illustrates a flow chart of a process of providing page navigation for a user in a browser of the user through JavaScript program embedded in a navigation page.

As illustrated in FIG. 10, firstly in the step S1010, upon receiving the above navigation page, the browser of the user loads and runs the JavaScript program embedded in the page. Next in the step S1020, the JavaScript program extracts the link(s) to the one or more recommended pages and the relevant page jump context information from the user session. Next in the step S1030, it is determined whether there is a link to a recommended page. If the determination result of the step S1030 is "No", then the process flow is terminated; otherwise in the step S1040, a navigation dialog box is popped up for the user to select one of the recommended pages. Next in the step S1050, in response to the selection of the user, the current page is redirected to the selected recommended page based upon the link to the selected recommended page and the relevant page jump context information. Alternatively, if there is only one recommended page extracted in the step S1020, then the current page may be redirected directly to the recommended page instead of popping up a navigation dialog box.

The apparatus for providing page navigation in a multirole-enabled network application according to the embodiment of the invention has been described above in details with reference to the drawings. A method for providing page navigation in a multirole-enabled network application according to an embodiment of the invention will be described below with reference to the drawings.

Figure 11:
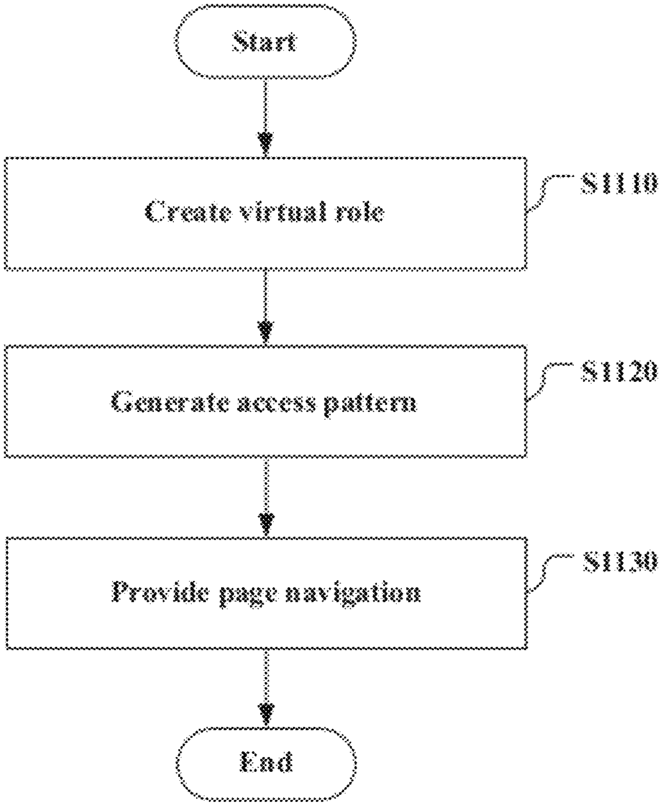
FIG. 11 illustrates a flow chart of a method for providing page navigation in a multirole-enabled network application, e.g. a SaaS application, etc., according to an embodiment of the invention.

FIG. 11 illustrates a flow chart of a method for providing page navigation in a multirole-enabled network application, e.g., a SaaS application, etc., according to an embodiment of the invention.

Firstly, in the step S1110, a virtual role is created for each user in the multirole-enabled network application based upon a predefined atomic role set configured for the user.

Next, in the step S1120, a virtual-role-based access pattern is generated by recording page access requests of the user and by performing pattern mining for the recorded page access requests according to the virtual role of the user. Here, the access pattern may comprise a page path pattern and/or a page jump context parameter.

Finally, in the step S1130, page navigation is provided by utilizing the access pattern corresponding to the virtual role of the user when the user accesses the multirole-enabled network application.

Figure 12:
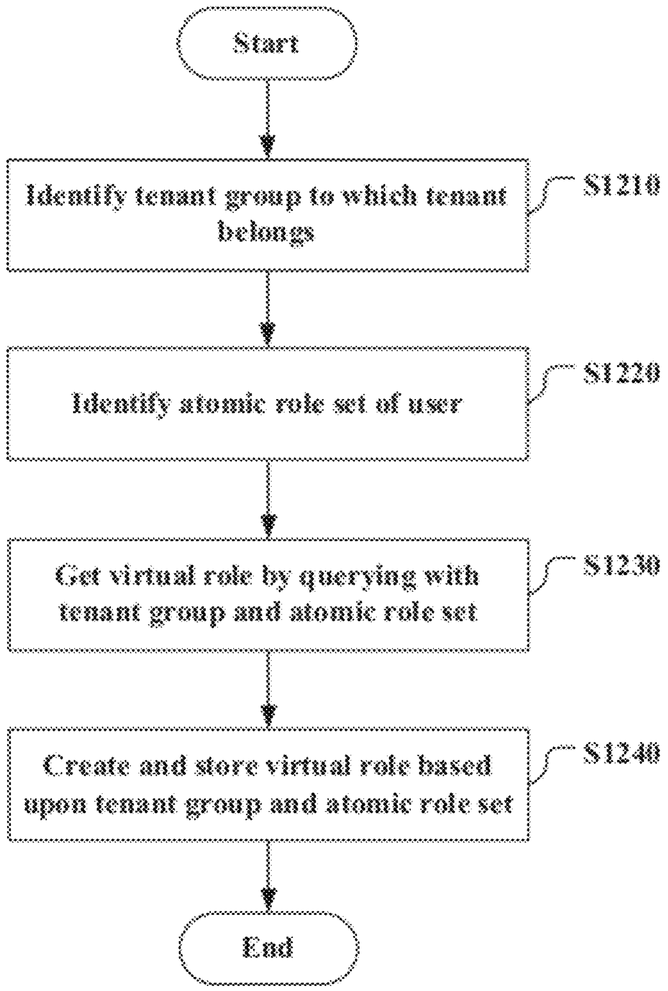
FIG. 12 illustrates a flow chart of a process of creating a virtual role in the step S1110 of FIG. 11 according to a particular preferred embodiment of the present invention.

FIG. 12 illustrates a flow chart of a process of creating the virtual role in the step S1110 of FIG. 11 according to a particular preferred embodiment of the present invention. The process may be performed when a tenant of the SaaS application is on boarding, for example.

As illustrated in FIG. 12, firstly in the step S1210, a tenant group to which the current tenant belongs is identified from tenant configuration information stored in the metadata repository 260, for example.

Next in the step S1220, for each user of the tenant, the predefined atomic role set configured for the user is identified from user configuration information stored in the metadata repository 260, for example.

Next in the step 1230, a virtual role map table in the metadata repository 260, for example, is queried with the identified tenant group and the identified predefined atomic role set, so as to finding out whether there is a virtual role in match with the identified tenant group and the identified predefined atomic role set.

Finally in the step S1240, if there is no virtual role in match then a virtual role is created based upon the identified tenant group and the identified predefined atomic role set and stored in the virtual role map table in the metadata repository 260, for example.

Figure 13:
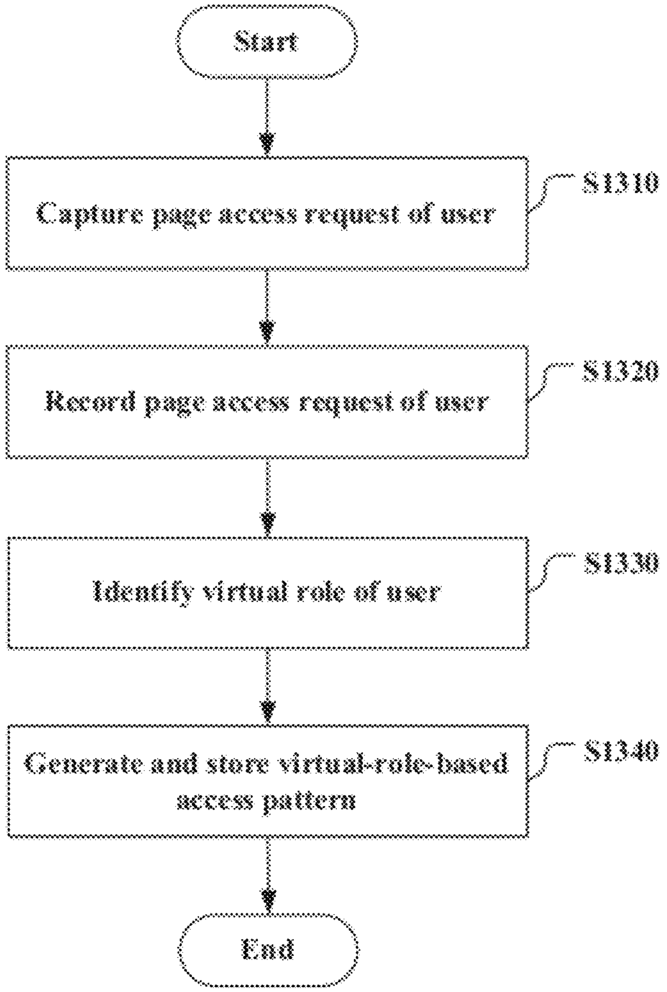
FIG. 13 illustrates a flow chart of a process of generating an access pattern in the step S1120 of FIG. 11 according to a particular preferred embodiment of the present invention.

FIG. 13 illustrates a flow chart of a process of generating an access pattern in the step S1120 of FIG. 11 according to a particular preferred embodiment of the present invention. The process may be performed when a user of a tenant accesses the SaaS application, for example.

As illustrated in FIG. 13, firstly in the step S1310, the page access request of the user is captured.

Next in the step S1320, the page access request of the user is recorded.

Next in the step S1330, the tenant group to which the current tenant belongs and the atomic role set of the user are identified from the captured page access request, and the virtual role of the user is identified from the identified tenant group and atomic role set.

Finally in the step S1340, a virtual-role-based access pattern is generated by performing pattern mining for the recorded page access requests according to the virtual role and stored in the virtual role access pattern map table in the metadata repository 260, for example, in association with the virtual role.

Figure 14:
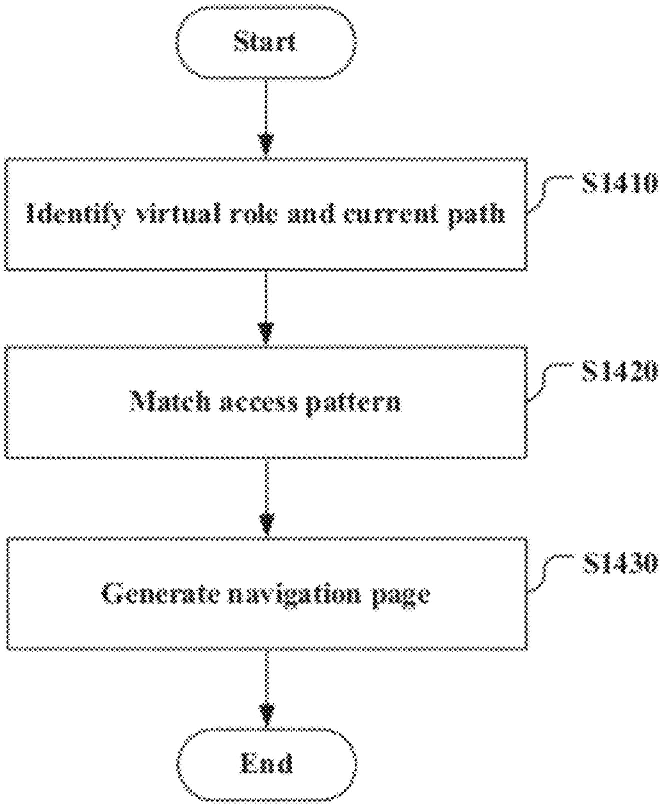
FIG. 14 illustrates a flow chart of a process of providing page navigation in the step S1130 of FIG. 11 according to a particular preferred embodiment of the present invention.

FIG. 14 illustrates a flow chart of a process of providing page navigation in the. step S1130 of FIG. 11 according to a particular preferred embodiment of the present invention. The process may be performed when a user of a tenant accesses the SaaS application, for example.

As illustrated in FIG. 14, firstly in the step S1410, a page access request of the user is captured to identify there from the virtual role and the current access path of the user.

Next in the step S1420, a virtual role access pattern map table in the metadata repository 260, for example, is queried based upon the identified virtual role and current access path of the user, to match a corresponding access pattern, so as to extract one or more recommended pages and the relevant page jump context information.

Finally in the step S1430, a navigation page is generated including links to the recommended page(s) and the relevant page jump context information.

According to the technical solution of a preferred embodiment of the present invention, pattern mining is performed for access data of one or more users according to virtual role, so the access data of the users can be accumulated rapidly for pattern mining, and resources required for calculation and storage of access patterns can be conserved. Moreover, when the role of a user is changed, the user can be provided with accurate personalized page navigation by utilizing an access pattern, if any, corresponding to the new role of the user. Also, for a new user, the user can be provided with accurate personalized. page navigation by utilizing an access pattern, if any, corresponding to the role of the new user.

The above apparatus and method may be implemented by hardware. Such hardware may be a single processing device or a plurality of processing devices. Such processing device may be a microprocessor, a microcontroller, a digital processor, a microcomputer, a part of a central processing unit, a state machine, a logic circuit and/or any device capable of manipulating a signal.

Also, it should be noted that, the above apparatus and method may be implemented by either software or firmware. In the case where the above apparatus and method are implemented by software or firmware, a program that constitutes the software is installed, from a storage medium or a network, into a computer having a dedicated hardware configuration, e.g., a general purpose personal computer 1500 as illustrated in FIG. 15, that when various programs are installed therein, becomes capable of performing various functions, or the like.

Figure 15:
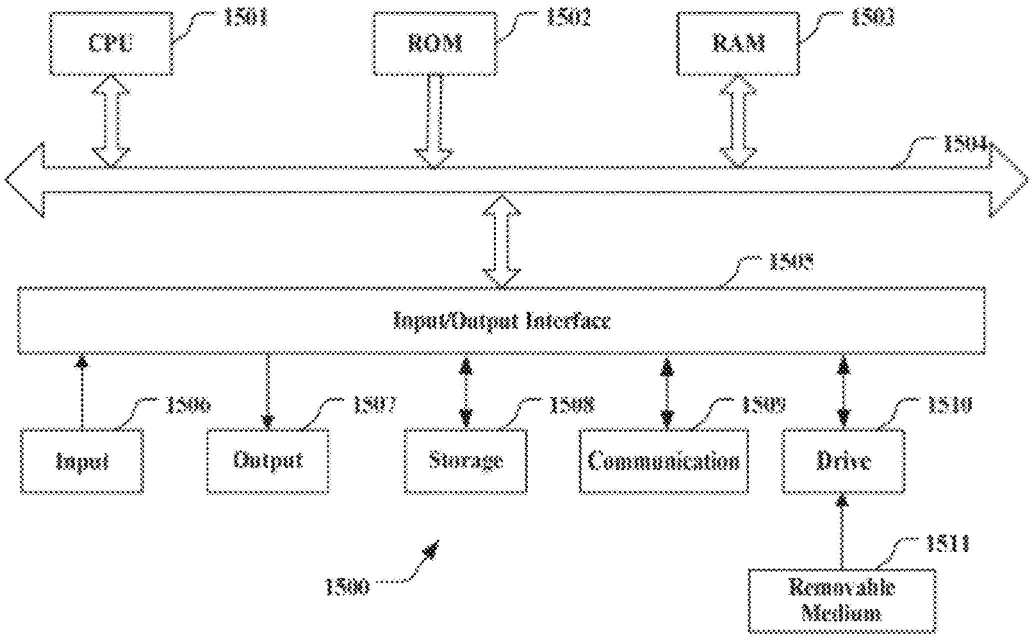
FIG. 15 illustrates a block diagram of an illustrative construction of a computer in which the invention is embodied.

In FIG. 15, a central processing unit (CPU) 1501 performs various processes in accordance with a program stored in a read only memory (ROM) 1502 or a program loaded from a storage section 1508 to a random access memory (RAM) 1503. In the RAM 1503, data required when the CPU 1501 performs the various processes or the like is also stored as required.

The CPU 1501, the ROM 1502 and the RAM 1503 are connected to one another via a bus 1504. An input/output interface 1505 is also connected to the bus 1504.

The following components are connected to input/output interface 1505: An input section 1506 including a keyboard, a mouse, or the like; An output section 1507 including a display such as a cathode ray tube (CRT), a liquid crystal display (LCD), or the like, and a loudspeaker or the like; the storage section 1508 including a hard disk or the like; and a communication section 1509 including a network interface card such as a LAN card, a modem, or the like. The communication section 1509 performs a communication process via the network such as the internet.

A drive 1510 is also connected to the input/output interface 1505 as required. A removable medium 1511, such as a magnetic disk, an optical disk, a magneto-optical disk, a semiconductor memory, or the like, is mounted on the drive 1510 as required, so that a computer program read there from is installed into the storage section 1508 as required.

In the case where the above-described series of processes are implemented by the software, the program that constitutes the software is installed from the network such as the internet or the storage medium such as the removable medium 1511.

One skilled in the art should note that, this storage medium is not limit to the removable medium 1511 having the program stored therein as illustrated in FIG. 15, which is delivered separately from the device for providing the program to the user. Examples of the removable medium 1511 comprise the magnetic disk (including a floppy disk (register trademark A the optical disk (including a compact disk-read only memory (CD-ROM) and a digital versatile disk (DVD)), the magneto-optical disk (including a mini-disk (MD) (register trademark)), and the semiconductor memory. Alternatively, the storage medium may be the ROM 1502, the hard disk contained in the storage section 1508, or the like, which have the program stored therein and is delivered to the user together with the device that containing them.

Obviously, in the apparatus and method of the present invention, respective components or steps can be decomposed and/or recombined. These decomposition and/or recombination should be regarded as equivalent solutions. Further, the step in which the above-described series of processes are performed may naturally be performed chronologically in order of description but needed not be performed chronologically. Some steps may be performed in parallel or independently of one another.

Although the embodiments of the present invention have been described in detail with reference to the accompanying drawings, it should be appreciated that, these embodiments are only used to illustrate the present invention but not to limit the present invention. Various modifications and changes can be made by those skilled in the art without departing from the scope of the present invention. Therefore, the scope of the present invention is only defined by the appended claims and the equivalents thereof.

For the avoidance of doubt, the term "comprising", as used herein throughout the description and claims is not to be construed as meaning "consisting only of".

The invention claimed is:

1. An apparatus for providing page navigation in a multirole-enabled network application, comprising:

a processor; and a memory coupled to the processor, wherein the memory comprises instructions which, when executed by the processor, cause the processor to:

create a virtual role for each user in the multirole-enabled network application based upon an atomic role set configured for the user, the atomic role set defined according to an allocation of one or more tasks which the user is responsible for in one or more roles associated with the user;

generate a virtual-role-based access pattern by recording page access requests of the user and by performing pattern mining for the recorded page access requests according to the virtual role of the user, wherein the virtual-role-based access pattern comprises a page path pattern and a page jump context parameter, and wherein the instructions further cause the processor to:

capture a page access request of the user to identify there from the virtual role and a current access path of the user thereby forming an identified virtual role;

match a corresponding access pattern based upon the identified virtual role and the current access path of the user, so as to extract one or more recommended pages and relevant page jump context information; and generate a navigation page including one or more links to the one or more recommended pages and the relevant page jump context information; and provide page navigation by utilizing the virtual-role-based access pattern corresponding to the virtual role of the user when the user accesses the multirole-enabled network application.

2. The apparatus according to claim 1, wherein the multirole-enabled network application is a Software as a Service (SaaS) application, wherein the user belongs to a tenant of the SaaS application, and wherein the atomic role set is configured for the user in accordance with the tenant to which the user belongs.

3. The apparatus according to claim 2, wherein the virtual role is created based upon a tenant group to which the tenant belongs.

4. The apparatus according to claim 3, wherein the instructions further cause the processor to:

identify the tenant group to which the tenant belongs according to configuration information of the tenant thereby forming an identified tenant group;

identify the atomic role set configured for the user based upon configuration information of the user thereby forming an identified atomic role set;

find out whether there is a virtual role in match with the identified tenant group and the identified atomic role set; and create and store the virtual role based upon the identified tenant group and the identified atomic role set if there is no virtual role in match.

5. The apparatus according to claim 1, wherein the instructions further cause the processor to:

capture the page access requests of the user;

record the page access requests of the user thereby forming recorded page access requests;

identify he virtual role of the user; and generate and store the virtual-role-based access pattern by performing pattern mining for the recorded page access requests according to the virtual role of the user.

6. The apparatus according to claim 1, wherein the virtual-role-based access pattern comprises a page path pattern and a page jump context parameter, and wherein the instructions further cause the processor to assist an administrator in configuring the page jump context parameter in the virtual-role-based access pattern.

7. A method for providing page navigation in a multirole-enabled network application, comprising:

creating a virtual role for each user in the multirole-enabled network application based upon an atomic role set configured for the user, the atomic role set defined according to an allocation of one or more tasks which the user is responsible for in one or more roles associated with the user;

generating a virtual-role-based access pattern by recording page access requests of the user and by performing pattern mining for the recorded page access requests according to the virtual role of the user, wherein the virtual-role-based access pattern comprises a page path pattern and a page context parameter, and wherein the method further comprises:

capturing a page access request of the user to identify there from the virtual role and a current access path of the user thereby forming an identified virtual role;

match a corresponding access pattern based upon the identified virtual role and the current access path of the user, so as to extract one or more recommended pages and relevant page lump context information; and generating a navigation page including one or more links to the one or more recommended pages and the relevant page jump context information; and providing page navigation by utilizing the virtual-role-based access pattern corresponding to the virtual role of the user when the user accesses the multirole-enabled network application.

8. The method according to claim 7, wherein the multirole-enabled network application is a Software as a Service (SaaS) application, wherein the user belongs to a tenant of the SaaS application, and wherein the atomic role set is configured for the user in accordance with the tenant to which the user belongs.

9. The method according to claim 8, wherein the virtual role is created based upon a tenant group to which the tenant belongs.

10. The method according to claim 9, further comprising:

identifying the tenant group to which the tenant belongs according to configuration information of the tenant thereby forming an identified tenant group;

identifying the atomic role set configured for the user based upon configuration information of the user thereby forming an identified atomic role set;

finding out whether there is a virtual role in match with the identified tenant group and the identified atomic role set; and if there is no virtual role in match, then creating and storing the virtual role based upon the identified tenant group and the identified atomic role set.

11. The method according to claim 7, wherein further comprising:

capturing the page access requests of the user;

recording the page access requests of the user thereby forming recorded page access requests;

identifying the virtual role of the user; and generating and storing the virtual-role-based access pattern by performing pattern mining for the recorded page access requests according to the virtual role.

12. The method according to claim 7, wherein the virtual-role-based access pattern comprises a page path pattern and a page jump context parameter, and wherein the page jump context parameter in the virtual-role-based access pattern is configurable by an administrator.

13. A computer program product comprising a computer readable device having a computer readable program stored therein, wherein the computer readable program, when executed on a computing device, causes the computing device to:

create a virtual role for each user in the multirole-enabled network application based upon an atomic role set configured for the user, the atomic role set defined according to an allocation of one or more tasks which the user is responsible for in one or more roles associated with the user;

generate a virtual-role-based access pattern by recording page access requests of the user and by performing pattern mining for the recorded page access requests according to the virtual role of the user, wherein the virtual-role-based access pattern comprises a page path pattern and a page jump context parameter, and wherein the computer readable program further causes the computing device to:

capture a page access request of the user to identify there from the virtual role and a current access path of the user thereby forming an identified virtual role;

match a corresponding access pattern based upon the identified virtual role and the current access path of the user, so as to extract one or more recommended pages and relevant page jump context information; and generate a navigation e including one or links to the one or more recommended pages and the relevant page jump context information; and provide page navigation by utilizing the virtual-role-based access pattern corresponding to the virtual role of the user when the user accesses the multirole-enabled network application.

14. The computer program product according to claim 13, wherein the multirole-enabled network application is a Software as a Service (SaaS) application, wherein the user belongs to a tenant of the SaaS application, and wherein the atomic role set is configured for the user in accordance with the tenant to which the user belongs.

15. The computer program product according to claim 14, wherein the virtual role is created based upon a tenant group to which the tenant belongs.

16. The computer program product according to claim 15, wherein the computer readable program further causes the computing device to:

identify the tenant group to which the tenant belongs according to configuration information of the tenant thereby forming an identified tenant group;

identify the atomic role set configured for the user based upon configuration information of the user thereby forming an identified atomic role set;

find out whether there is a virtual role in match with the identified tenant group and the identified atomic role set; and create and store the virtual role based upon the identified tenant group and the identified atomic role set if there is no virtual role in match.

17. The computer program product according to claim 13, wherein the computer readable program further causes the computing device to:

capture the page access requests of the user;

record the page access requests of the user thereby forming recorded page access requests;

identify the virtual role of the user; and generate and store the virtual-role-based access pattern by performing pattern mining for the recorded page access requests according to the virtual role of the user.

18. The computer program product according to claim 13, wherein the virtual-role-based access pattern comprises a page path pattern and a page jump context parameter, and wherein the computer readable program further causes the computing device to assist an administrator in configuring the page jump context parameter in the virtual-role-based access pattern.

* * * * *